United States Patent

Chen et al.

[11] Patent Number: 5,870,628
[45] Date of Patent: Feb. 9, 1999

[54] ADAPTOR FOR RECEIVING AND PROCESSING ASYNCHRONOUS TRANSFER MODE CELLS WITHIN A COMPUTER NETWORK

[75] Inventors: Wen-Tzer Thomas Chen; Yat Hung Ng; Gary Yuh Tsao; Earl James McDonald, all of Austin, Tex.

[73] Assignee: International Business Machines Corporation, Armonk, N.Y.

[21] Appl. No.: 664,206

[22] Filed: Jun. 11, 1996

[51] Int. Cl.[6] ...................................................... G06F 13/00
[52] U.S. Cl. .......................... 395/842; 395/849; 395/872; 395/200.62; 395/200.8; 370/235; 370/474
[58] Field of Search .................................... 395/200, 842, 395/849, 872, 200.62, 200.8; 390/396, 474, 94.1, 349; 370/235, 474

[56] References Cited

U.S. PATENT DOCUMENTS

| | | | |
|---|---|---|---|
| 5,136,584 | 8/1992 | Hedlund | 370/94.1 |
| 5,440,691 | 8/1995 | Carrafiello et al. | 395/200.64 |
| 5,625,625 | 4/1997 | Oskouy et al. | 370/385 |
| 5,633,867 | 5/1997 | Ben-Nun et al. | 370/799 |
| 5,633,870 | 5/1997 | Gaytan et al. | 370/235 |
| 5,638,367 | 6/1997 | Gaytan et al. | 370/471 |
| 5,664,116 | 9/1997 | Gaytan et al. | 395/200.64 |
| 5,668,809 | 9/1997 | Rostoker et al. | 370/94.1 |
| 5,673,279 | 9/1997 | Oskouy et al. | 371/67.1 |
| 5,675,829 | 10/1997 | Oskouy et al. | 395/826 |
| 5,680,401 | 10/1997 | Gaytan et al. | 370/474 |
| 5,689,509 | 11/1997 | Gaytan et al. | 370/396 |
| 5,740,448 | 4/1998 | Gentry et al. | 395/726 |
| 5,745,684 | 4/1998 | Oskouy | 395/200.8 |
| 5,745,790 | 4/1998 | Oskouy | 395/853 |

*Primary Examiner*—Christopher B. Shin
*Attorney, Agent, or Firm*—Mark E. McBurney; Anthony P. Ng; Andrew J. Dillon

[57] ABSTRACT

A network adaptor for receiving and processing Asynchronous Transfer Mode cells within a computer network is disclosed. The network adaptor includes a raw cell buffer, a control table, several Direct Memory Access buffers, and a Direct Memory Access controller. The raw cell buffer is utilized for receiving Asynchronous Transfer Mode cells from the computer network. The control table includes a multiple of virtual circuit identifier entries. When a corresponding virtual circuit identifier of the Asynchronous Transfer Mode cell is found in one of the multiple of virtual circuit identifier entries within the control table, one of the several Direct Memory Access buffers is set to receive the Asynchronous Transfer Mode cell. The Direct Memory Access controller is then utilized for initiating a Direct Memory Access transfer of the Asynchronous Transfer Mode cell from one of the several Direct Memory Access buffers when a pre-set threshold for Asynchronous Transfer Mode cell transfer is reached, such that Asynchronous Transfer Mode cell processing performance may be optimized to a receiving computer system in which the network adaptor is installed.

16 Claims, 4 Drawing Sheets

ADAPTOR FOR RECEIVING AND PROCESSING ASYNCHRONOUS TRANSFER MODE CELLS WITHIN A COMPUTER NETWORK

BACKGROUND OF THE INVENTION

1. Technical Field

The present invention relates to an apparatus for data processing in general and, in particular, to an apparatus for receiving data within a computer network. Still more particularly, the present invention relates to an adaptor for receiving and processing Asynchronous Transfer Mode cells within a computer network.

2. Description of the Prior Art

The transmitting and receiving of data within a computer network is well known in the art. A typical computer network consists of at least one server computer and at least one client computer. The server computer is connected to the client computer via various communications media. These communications media may include, for example, telephone lines, channels, satellites, etc. By entering a request at the client computer, a user may extract information from the server computer. Similarly, a user may enter information on the client computer and have the information transmitted to the server computer and/or to another client computer on the computer network.

Within the computer network, information is typically transmitted and received in the form of data packets. In essence, a sending message is first broken up into many data packets, and each data packet is then transmitted to a receiving computer within the computer network. Each data packet is a separate entity on the communications media. After receipt within the network, each data packet is then stored in a buffer memory residing on a network adaptor, and finally, all of the data packets within the message are forwarded to a system memory within the receiving computer. This kind of network adaptor is commonly referred to as a "packet-based" adaptor or a stored-and-forward adaptor because data packets are first stored and then forwarded to the system memory by the network adaptor.

Generally, a packet-based adaptor requires a large amount of memory in order to buffer all the incoming data packets. This is especially true when the packet-based adaptor has to support a high-speed network link. A packet-based adaptor also requires an embedded controller with microcode or, alternately, some sophisticated hardware logic for managing the on-board buffer memory. Needless to say, the design complexity for such packet-based adaptor is very high, which translates into long development time and high manufacturing cost.

In addition to high design complexity, performance, such as adaptor latency, is also a big concern for packet-based adaptors. The temporary storage of packets in the buffer memory and the subsequent forwarding of packets to the system memory take time. When utilizing an embedded controller, which is commonly found in most packet-based adaptors, the execution of microcode could introduce additional latency (typically in the range of several hundred microseconds) to the processing of data packets. Because of the microcode execution and other overhead, the response time of a packet-based adaptor may be much longer than expected.

Furthermore, a packet-based adaptor also lacks flexibility and expandability. The buffer memory on the packet-based adaptor is dedicated only to that particular adaptor, hence, even when the network link is idle, no other process in the computer can take advantage of the on-board buffer memory. Also, in order to support virtual circuits, the required memory could be beyond what is presently capable within a typical packet-based adaptor. This is especially true for Asynchronous Transfer Mode (ATM) that is typically utilized in a high-end server environment, in which a large number of virtual circuits are required.

An alternative to the packet-based adaptor design is a cut-through (or pass-through) architecture. Under this architecture, the data packet receiving path is directly transferred from the network to the system memory via a speed-matching First-In-First-Out (FIFO) buffer to adapt to variations of the bus acquisition time and the speed mismatch between the network and the system bus. When applying the cut-through architecture, such adaptor can be called a "cell-based" adaptor because data is forwarded in one cell, and not packet, at a time. Without the requirement of storing-and-forwarding, the cell-based adaptor can eliminate the buffer memory and the necessity of an embedded controller. Thus, a cell-based adaptor has a much simpler architecture with minimal design complexity, which translates to lower manufacturing costs and less development time.

In addition, a cell-based adaptor also provides better flexibility and expandability over a packet-based counterpart. This is because the number of virtual circuits that can be supported by an adaptor is no longer restricted by the available local memory on the adaptor. In fact, the number of virtual circuits can grow as long as the system memory in the receiving computer can support such growth. Further, the performance of the cell-based adaptor, based on adaptor latency, is significantly better than that of the packet-based adaptor. This is due to the fact that the required latency for a packet-based adaptor to copy data in and out of the buffer memory is totally eliminated. The adaptor latency is further reduced by eliminating the need for managing a buffer memory. In sum, a cell-based adaptor has a superior latency performance, a lower design complexity, a lower development cost, a lower bill material cost, and still provides the flexibility and expandability for supporting many virtual circuits. In a client environment and lightly loaded low-end server environment, the low-cost, high-performance cell-based adaptor is an excellent choice.

However, a cell-based adaptor also poses some problems with respect to the overall system performance, especially for the high-end servers that need to support heavy I/O activities. A cell-based adaptor transfers data from a 48-byte Asynchronous Transfer Mode (ATM) cell to the system memory through the I/O bus and the system bus one at a time. Bursting data at a relatively small size of 48-byte could consume excessive bus bandwidth because a fixed bus protocol overhead will be incurred every time data is transferred. Also, the system memory in a high-end computer system is usually being accessed at a 32-byte or 64-byte segment at a time. Writing data that is not 32-byte or 64-byte aligned within such computer system would require a read-modified-write operation to be performed in order to prevent any data corruption. Thus, valuable memory bandwidth could be wasted because of this requirement of a read-modified-write operation for every transmission of 48-byte ATM cells to the system memory.

Much severe system performance degradation, however, comes from the high possibility of cell-dropping whenever the I/O bus cannot be acquired on time. A cell-based adaptor could transfer an ATM cell only if it can acquire the I/O bus. In a heavily equipped computer system, the cell-based adaptor could wait a long time (in the range of tens of microseconds) before the I/O bus is available. Because only one ATM cell within the FIFO buffer can be freed up every time the I/O bus is acquired, the FIFO buffer could be completely full in a short time if the ATM cells keep arriving from the high-speed computer network while the I/O bus can be acquired only every once in a while. When the FIFO buffer becomes full, the next arriving ATM cell will be dropped. A data packet with dropped cell(s) will be retransmitted by the sending computer when the error is detected by the upper-layer protocol. Needless to say, the recovery of dropped cells could consume system resources and would impact the overall system throughput as well as response time. When the cell-dropping rate is high, which is highly probable in a busy server environment, the system performance could be degraded significantly. Consequently, it would be desirable to provide a network adaptor for receiving and processing ATM cells in a more efficient manner within a computer network.

SUMMARY OF THE INVENTION

In view of the foregoing, it is therefore an object of the present invention to provide an improved apparatus for data processing.

It is another object of the present invention to provide an improved apparatus for receiving data within a computer network.

It is yet another object of the present invention to provide an improved adaptor for efficiently receiving and processing ATM cells within a computer network.

In accordance with the present invention, the adaptor includes a raw cell buffer, a control table, several Direct Memory Access buffers, and a Direct Memory Access controller. The raw cell buffer is utilized for receiving Asynchronous Transfer Mode cells from the computer network. The control table includes a multiple of virtual circuit identifier entries. When a corresponding virtual circuit identifier of the Asynchronous Transfer Mode cell is found in one of the multiple of virtual circuit identifier entries within the control table, one of the several Direct Memory Access buffers is set to receive the Asynchronous Transfer Mode cell. The Direct Memory Access controller is then utilized for initiating a Direct Memory Access transfer of the Asynchronous Transfer Mode cell from one of the several Direct Memory Access buffers when a pre-set threshold for Asynchronous Transfer Mode cell transfer is reached, such that Asynchronous Transfer Mode cell processing performance may be optimized to a receiving computer system in which the network adaptor is installed.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 is a high-level flow diagram illustrating a control logic for a DMA controller within the network adaptor of FIG. 2, according to a preferred embodiment of the invention.

DETAILED DESCRIPTION OF PREFERRED EMBODIMENT

The present invention may be applicable to a variety of computers, such as a personal computer, a mini-computer, or a mainframe computer, within a computer network, such as a local-area network (LAN) or a wide-area network (WAN). For the purpose of illustration, a preferred embodiment of the present invention, as described below, is implemented on a mini-computer, such as the AS/400™ series manufactured by International Business Machines Corporation.

Figure 1:
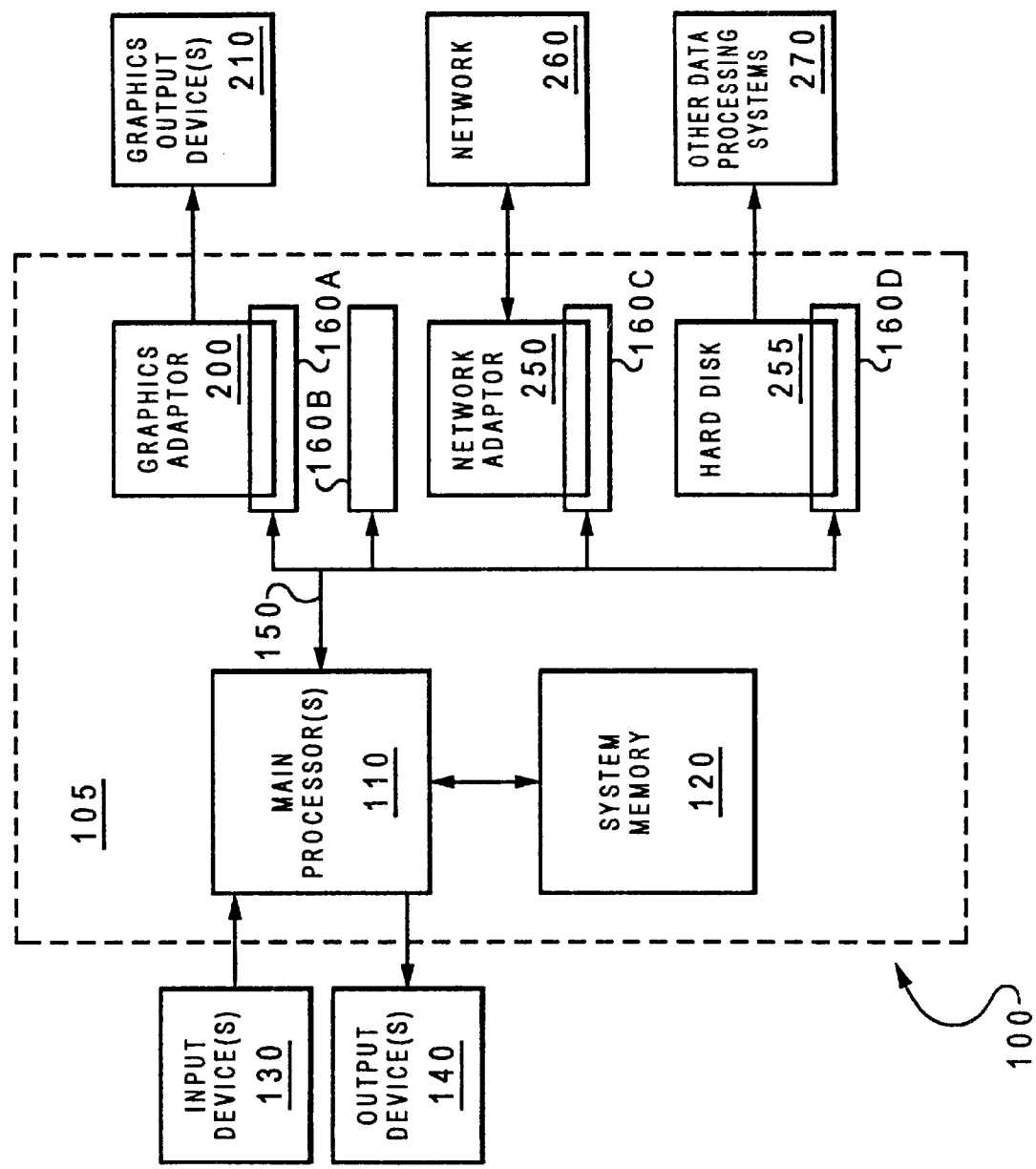
FIG. 1 is a block diagram of a computer that may utilize a preferred embodiment of the invention.

Referring now to the drawings and in particular to FIG. 1, there is illustrated a block diagram of computer 100 that may utilize a preferred embodiment of the present invention. Computer 100 typically includes main processor(s) 110 coupled to a system memory 120 within processor unit 105, having input device(s) 130 and output device(s) 140 attached thereto. Main processor(s) 110 may include a single processor or multiple processors. Input device(s) 130 may include a keyboard, a keypad, or other types of input device. Output device(s) 140 may include a monitor, a printer, or other types of output device. A number of peripheral devices may be connected to adaptor slots 160A, 160B, 160C, and 160D in order to provide communications with main processor 110 via I/O bus 150. As shown in FIG. 1, graphics adaptor 200, network adaptor 250, and hard disk 255 are connected to adaptor slots 160A, 160C and 160D, respectively, while adaptor slot 160B remains open. Graphics adaptor 200 receives instructions regarding graphics from main processor 110 via I/O bus 150, thereby rendering the desired graphics output from main processor 110 to graphics output device(s) 210. Network adaptor 250 may communicate with other data processing systems 270 across network 260. Hard disk 255 receives instructions from main processor 110 regarding writing and reading information to and from hard disk 255. Typically, information from hard disk 255 is transferred to system memory 120 to be utilized by main processor(s) 110. However, a different type of memory known as a cache memory (not shown) may also be present, normally between main processor(s) 110 and system memory 120, for enhancing the speed of memory access by main processor(s) 110.

Figure 2:
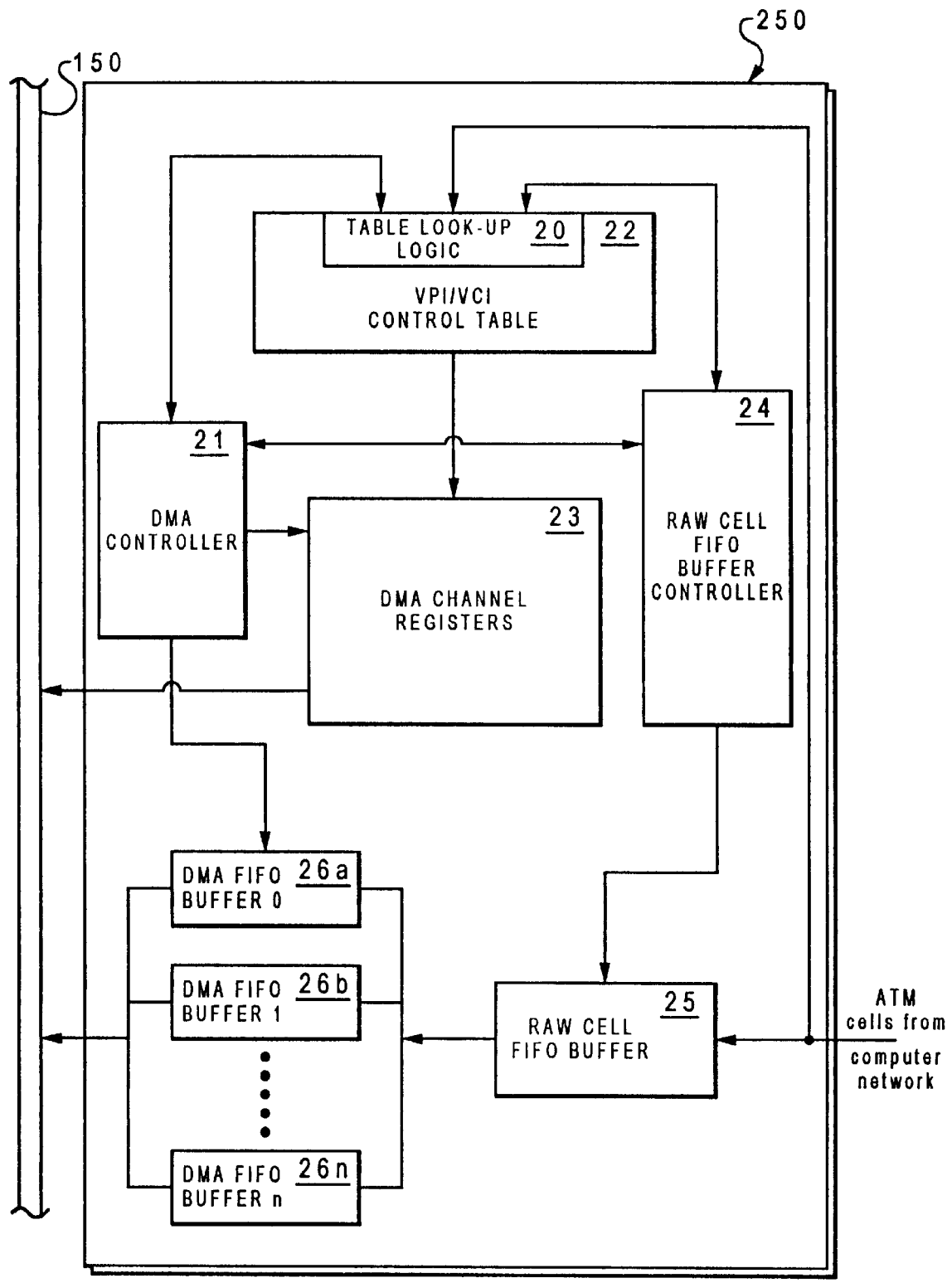
FIG. 2 is a functional block diagram of a receiving portion of a network adaptor in accordance with a preferred embodiment of the invention.

With reference now to FIG. 2, there is illustrated a functional block diagram of a receiving portion of a network adaptor 250 in accordance with a preferred embodiment of the invention. As shown, the receiving portion of network adaptor 250 comprises a raw cell First-In-First-Out (FIFO) buffer 25 along with a raw cell FIFO buffer controller 24, a multiple number of Direct Memory Access (DMA) FIFO buffers 26a–26n along with a DMA controller 21, a VPI/VCI (virtual path identifier/virtual circuit identifier) control table 22 having a table look-up logic 20, and a set of DMA channel registers 23. As a preferred embodiment of the invention, raw cell buffer 25 and DMA buffers 26a–26n are First-In-First-Out buffers, though a different type of buffers may also be utilized.

An incoming Asynchronous Transfer Mode (ATM) cell from network 260 is first received and deposited into raw cell FIFO buffer 25 after a Header Error Check (HEC) field of the ATM cell has been successfully processed. Raw cell FIFO buffer controller 24 then examines a VPI/VCI field in a 4-byte header of the ATM cell at the "head" of raw cell FIFO buffer 25 to determine if its VPI/VCI pair matches one of the VPI/VCI entries within VPI/VCI control table 22. A detailed description of a VPI/VCI entry within VPI/VCI control table 22 will be shown later in FIG. 3. In the case of a "hit," i.e., when a VPI/VCI pair matches one of the VPI/VCI entries within VPI/VCI control table 22, the ATM cell is deposited to one of DMA FIFO buffers 26a–26n, which is associated with the VPI/VCI after the 4-byte ATM header is being processed and stripped off. Raw cell FIFO buffer controller 24 then processes the next ATM cell in raw cell FIFO buffer 25 if the number of ATM cell data in DMA FIFO buffers 26a–26n does not exceed a pre-set threshold value for initiating a DMA transfer. This pre-set threshold value is adjustable by a user to a value for cell data transfer that is most optimal for receiving computer 100. Otherwise, raw cell FIFO buffer controller 24 will notify DMA controller 21 to start a DMA transfer after acquiring I/O bus 150. DMA controller 21 then transfers all the ATM cell data from one of DMA FIFO buffers 26a–26n to a designated location within system memory 120 as specified in DMA channel registers associated with the particular DMA FIFO buffer. When all the ATM cell data in that specific one of DMA FIFO buffers 26a–26n are emptied, DMA controller 21 continues to serve a next one of DMA FIFO buffers 26a–26n until all DMA FIFO buffers 26a–26n have been served or I/O bus 150 is preempted by other I/O devices within the computer.

Because DMA controller 21 has the potential to empty all the cells within DMA FIFO buffers 26a–26n once DMA controller 21 has acquired I/O bus 150, the probability of cell-dropping is reduced to a minimum. In addition, the pre-set threshold value for a DMA transfer can be tuned to support a bursting size that is optimized for both bus utilization and memory bandwidth consumption. On the contrary, in a client environment or a lightly-loaded server environment when cell-dropping is not a major concern, DMA controller 21 can be programmed to initiate a DMA transfer only when any of DMA FIFO buffers 26a–26n has more ATM cells than a pre-set threshold value.

Figure 3:
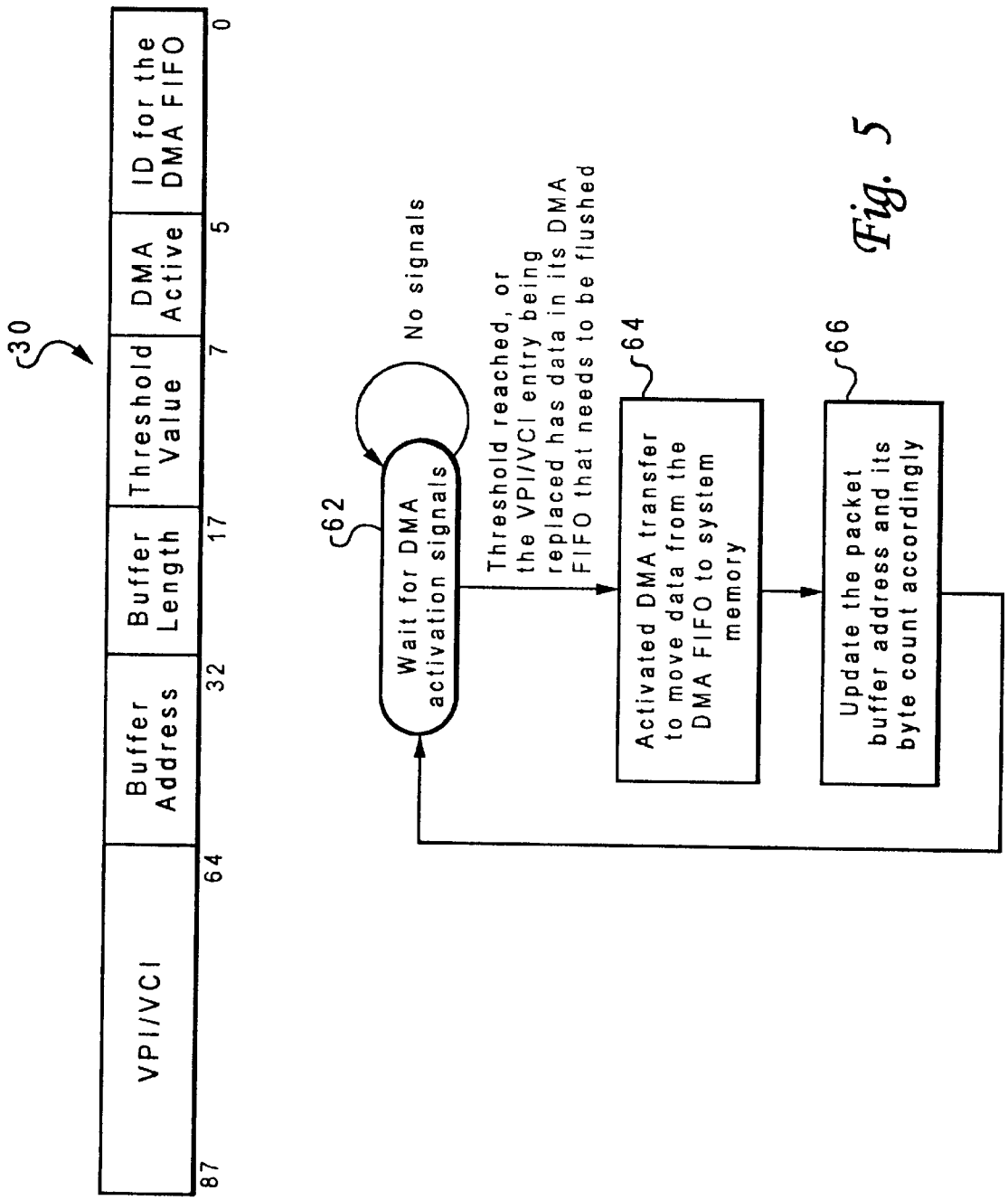
FIG. 3 is a detailed illustration of an entry within a VPI/VCI control table, according to a preferred embodiment of the invention.

In a case when the VPI/VCI of the ATM cell being processed is in one of the VPI/VCI entries within VPI/VCI control table 22 but is in an inactive state, i.e., bit 5 of the entry shown in FIG. 3 is cleared, a free DMA FIFO buffer and its associated registers within DMA channel registers 23 need to be allocated and programmed to activate such entry. This will ensure the ATM cells coming from this newly activated virtual circuit could be buffered within one of DMA FIFO buffers 26a–26n, as described in the previous paragraph.

However, if there is no free buffer in DMA FIFO buffers 26a–26n available for a VPI/VCI entry within VPI/VCI control table 22, a buffer within DMA FIFO buffers 26a–26n that is least recently used (LRU), in other words, a buffer having no cell recently arrived from its associated VPI/VCI (a potentially stale virtual circuit), will be allocated for the virtual circuit. First, the DMA FIFO buffer associated with the "stale" entry in VPI/VCI control table 22 will be flushed to the system memory. The "stale" entry will then be updated with the buffer address and the remaining buffer length from DMA channel registers 23, indicating that no DMA FIFO buffer is associated with that VPI/VCI entry any more. The DMA FIFO buffer and associated DMA channel registers will then be reassigned to the requesting VPI/VCI by indicating the DMA FIFO buffer/channel ID in the entry and programming the DMA channel registers with the address and length of the buffer in the system memory. Once the entry and the DMA channel registers are updated, the ATM cell will be deposited to the designated buffer within DMA FIFO buffers 26a–26n. The next ATM cells from the same virtual circuit would then be able to be deposited into the same buffer within DMA FIFO buffers 26a–26n until end-of-cell is detected or the VPI/VCI entry becomes inactive. When the end-of-cell is detected, the VPI/VCI entry will be removed from VPI/VCI control table 22 after its DMA FIFO buffer is flushed back to the system memory.

Any replacement algorithm besides LRU can be utilized to re-assign a buffer within DMA FIFO buffers 26a–26n. If the concern is about running out of space within raw cell FIFO buffer 25, it is suggested that a VPI/VCI entry within VPI/VCI control table 22 that is being DMAed or the entry whose DMA FIFO buffer contains the least number of cells be replaced.

If the ATM cell being processed by raw cell FIFO buffer controller 24 could not find its VPI/VCI entry in VPI/VCI control table 22, an entry will be allocated from VPI/VCI control table 22. The system buffer address and length for the VPI/VCI entry will be obtained from the control memory where the buffer descriptor for the VPI/VCI and other control information is located. The same procedure of allocating one of DMA FIFO buffers 26a–26n and its associated DMA channel registers 23 as described in the previous paragraphs will be followed to activate the VPI/VCI entry before the ATM cell can be deposited to a buffer within DMA FIFO buffers 26a–26n.

Referring now to FIG. 3, there is shown a detailed illustration of an entry within VPI/VCI control table 22, in accordance with a preferred embodiment of the invention. VPI/VCI entry 30 is 88 bits long. Bits 0–4 provide an identification of a buffer within DMA FIFO buffers 26a–26n to be utilized for a virtual circuit. Bit 5 indicates whether any one of DMA FIFO buffers 26a–26n has been assigned. Bit 6 indicates whether a DMA transfer is active for that particular DMA FIFO buffer. Bits 7–16 provide a pre-set threshold value for initiating a DMA transfer of ATM cell data. Bits 17–31 indicate the remaining length of the system buffer address in the system memory. Bits 32–63 provide the system buffer address in the system memory. Finally, bits 64–87 contain the virtual circuit identified by a VPI/VCI.

Figure 4:
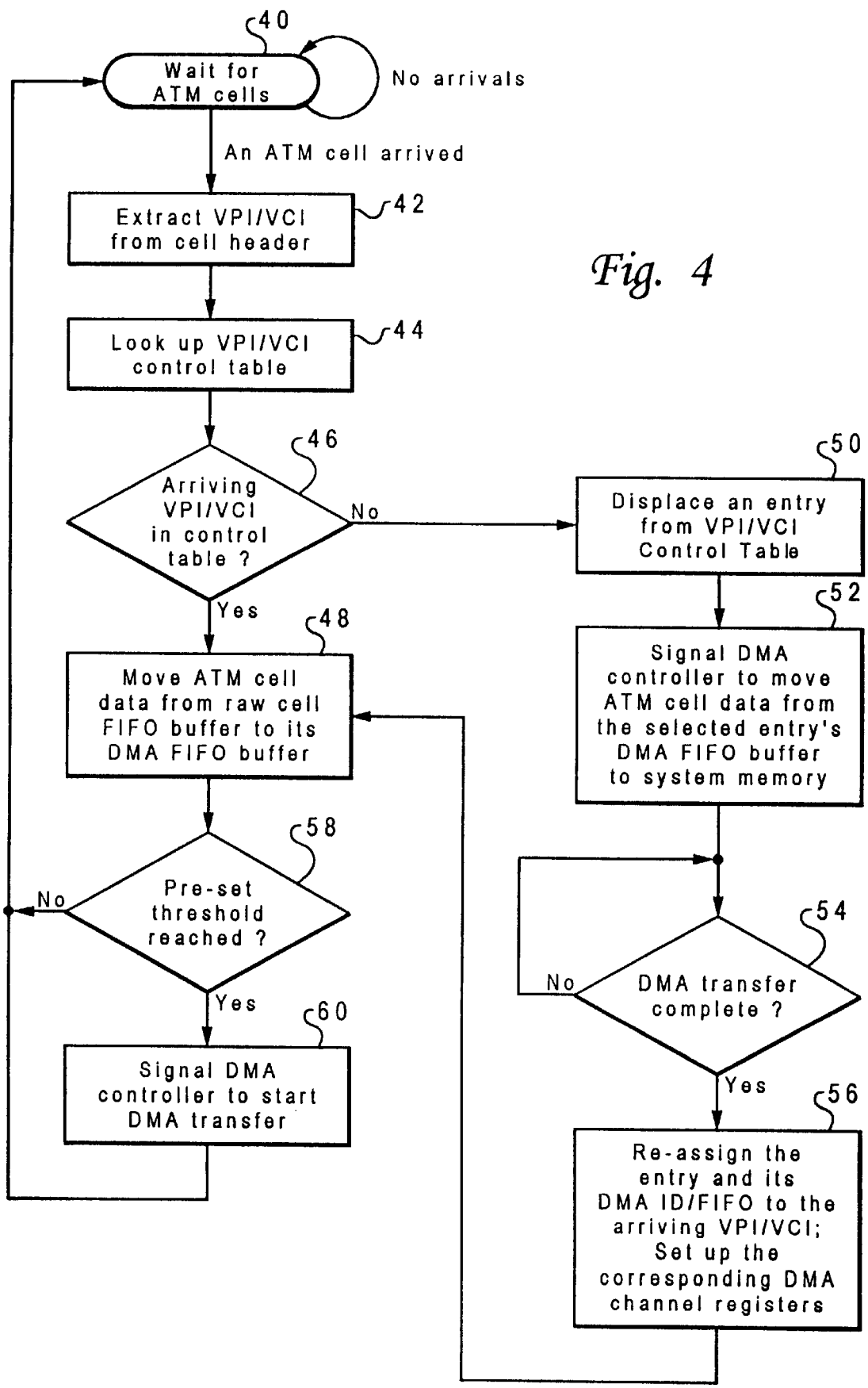
FIG. 4 is a high-level flow diagram of a method for receiving and processing ATM cells performed by the network adaptor of FIG. 2, in accordance with a preferred embodiment of the invention.

With reference now to FIG. 4, there is illustrated a high-level flow diagram of a method of receiving and processing ATM cells performed by the network adaptor of FIG. 2, in accordance with a preferred embodiment of the invention. Starting from the beginning, the network adaptor is waiting for an ATM cell to arrive from the computer network, and the network adaptor will remain in this waiting state until the arrival of an ATM cell, as shown in block 40. After the arrival of an ATM cell at the raw cell FIFO buffer, a VPI/VCI is extracted from the header of the arrived ATM cell, as depicted in block 42. Then, a table look-up is performed by the table look-up logic in the VPI/VCI control table in order to determine whether the VPI/VCI of the ATM cell matches one of the VPI/VCI entries within the VPI/VCI control table or not, as illustrated in block 44 and block 46, respectively.

If the VPI/VCI of the ATM cell does not match any one of the VPI/VCI entries within the VPI/VCI control table, then the following steps are performed. First, an entry is displaced from the VPI/VCI control table, as shown in block 50. Any replacement scheme that is well known in the art, such as least recently used (LRU), can be utilized to select a candidate to be displaced. Other replacement schemes that are also acceptable include selecting a DMA FIFO buffer having no ATM cell or a DMA FIFO buffer having the most ATM cells. Then, the DMA controller is signalled to initiate a DMA transfer to move ATM cell data that is associated with the above selected entry from the corresponding DMA FIFO buffer to the system memory, as illustrated in block 52. The process subsequently enters a looping mode until the DMA transfer is fully completed, as depicted in block 54. Finally, the selected entry in the VPI/VCI control table along with its DMA channel ID and its associated FIFO buffer are re-assigned to the VPI/VCI of the newly arrived ATM cell. The corresponding DMA channel registers are also set up, as depicted in block 56. After all the above-identified steps have been completed, the process then proceeds to block 48.

However, if the VPI/VCI of the ATM cell matches one of the VPI/VCI entries within the VPI/VCI control table, then the ATM cell is moved from the raw cell FIFO buffer to one of the DMA FIFO buffers, identified by a DMA channel ID, as shown in block 48. At this point, a determination is made as to whether a pre-set threshold value for a DMA transfer of ATM cell data currently stored in the DMA FIFO buffers has been reached or not, as illustrated in block 58. If the pre-set threshold value has not been reached, the process returns back to block 40 to wait for a next ATM cell from the network. Otherwise, if the pre-set threshold value has been reached, the DMA controller is signalled to start a DMA transfer for moving ATM cell data from the DMA FIFO buffer to the system memory. Then, the process returns back to block 40.

Referring now to FIG. 5, there is illustrated a high-level flow diagram of a control logic for DMA controller 21 within the network adaptor of FIG. 2, according to a preferred embodiment of the invention. Starting from the beginning, DMA controller 21 is waiting for a DMA activation signal, and DMA controller 21 will remain in this waiting state until the arrival of a DMA activation signal, as shown in block 62. When there is a DMA activation signal because the pre-set threshold value has been reached (block 60 of FIG. 4) or an entry in the VPI/VCI control table is being replaced such that a corresponding one of the DMA FIFO buffers needs to be flushed (block 52 of FIG. 4), the DMA transfer is activated for moving ATM cell data from that corresponding one of the DMA FIFO buffers to the system memory, as illustrated in block 64. Finally, the packet buffer address and its byte count are updated accordingly, as depicted in block 66, and the process returns back to block 62 to wait for another DMA activation signal. The process as shown in FIG. 5 can be performed in concurrence with the process shown in FIG. 4.

As has been described, the present invention provides a network adaptor for receiving and processing ATM cells within a computer network. The mechanism for receiving and processing ATM cells illustrated under the present invention provides the flexibility for tuning and optimizing performance based on the system configuration and its I/O characteristics. Suffice it to say, all of these advantages can be accomplished without utilizing costly buffer memory on the adaptor card as virtual circuit capacity requirements increase.

While the invention has been particularly shown and described with reference to a preferred embodiment, it will be understood by those skilled in the art that various changes in form and detail may be made therein without departing from the spirit and scope of the invention.

What is claimed is:

1. A network adaptor for receiving and processing cells from a computer network, wherein said network adaptor is included within a receiving computer having a system memory said network adaptor comprising:

a raw cell buffer for receiving a cell from said computer network;

a control table, wherein said control table includes a plurality of virtual circuit identifier entries;

a plurality of Direct Memory Access buffers, wherein one of said plurality of Direct Memory Access buffers is utilized to receive said cell when a corresponding virtual circuit identifier of said cell is found in one of said plurality of virtual circuit identifier entries within said control table; and a Direct Memory Access controller for initiating a Direct Memory Access transfer of cell data from said one of said plurality of Direct Memory Access buffers to said system memory of said receiving computer when a pre-set threshold value for cell data transfer is reached by an accumulation of cells, such that cell processing performance may be optimized to said receiving computer in which said network adaptor is installed.

2. The network adaptor according to claim 1, wherein said cell is an Asynchronous Transfer Mode cell.

3. The network adaptor according to claim 1, wherein said raw cell buffer is a First-In-First-Out buffer.

4. The network adaptor according to claim 1, wherein said plurality of Direct Memory Access buffers are First-In-First-Out buffers.

5. The network adaptor according to claim 1, wherein said network adaptor further includes a raw cell buffer controller to examine a header of said cell to determine whether a corresponding virtual circuit identifier of said cell is found in said control table.

6. The network adaptor according to claim 1, wherein said control table further includes table look-up logic.

7. A method for receiving and processing cells from a computer network by a network adaptor, wherein said network adaptor is included within a receiving computer having a system memory, said method comprising the steps of:

receiving a cell from said computer network;

extracting a virtual circuit identifier from a header of said cell;

determining whether or not said virtual circuit identifier matches one of the entries in a control table;

in response to a determination that said virtual circuit identifier does not match one of the entries in said control table, displacing one of said entries in said control table to permit storage of said virtual circuit identifier and moving said cell to one of a plurality Direct Memory Access buffers;

in response to a determination that said virtual circuit identifier matches one of the entries in said control table, moving said cell to a Direct Memory Access buffer;

determining whether or not a pre-set threshold value for cell transfer is reached;

in response to a determination that said pre-set threshold value is reached, signalling a Direct Memory Access controller to start a Direct Memory Access transfer for moving cell data from said one of said plurality of Direct Memory Access buffers to said system memory of said receiving computer; and in response to a determination that said pre-set threshold value is not reached, returning to said receiving step.

8. The method according to claim 7, wherein said cell is an Asynchronous Transfer Mode cell.

9. The method according to claim 7, wherein said displacing step is by replacing the least recently used entries in said control table.

10. The method according to claim 7, wherein said replacing step is performed by a raw cell First-In-First-Out buffer.

11. The method according to claim 7, wherein said extracting step is performed by a raw cell First-In-First-Out buffer controller.

12. The method according to claim 7, wherein both of said determination steps are performed by a table look-up logic within said control table.

13. A computer program product for receiving and processing cells from a computer network by a network adaptor, wherein said network adaptor is included within a receiving computer having a system memory, said computer program product comprising:

program code means for receiving a cell from said computer network;

program code means for extracting a virtual circuit identifier from a header of said cell;

program code means for determining whether or not said virtual circuit identifier matches one of the entries in a control table;

program code means for moving said cell to a Direct Memory Access buffer, in response to a determination that said virtual circuit identifier matches one of the entries in said control table;

program code means for determining whether or not a pre-set threshold value for cell transfer is reached; and program code means for signalling a Direct Memory Access controller to start a Direct Memory Access transfer for moving cell data from said one of said plurality of Direct Memory Access buffers to said system memory of said receiving computer, in response to a determination that said pre-set threshold value is reached.

14. The computer program product according to claim 13, wherein said computer program product further includes a program code means for displacing one of said entries in said control table to permit storage of said virtual circuit identifier and moving said cell to one of a plurality Direct Memory Access buffers, in response to a determination that said virtual circuit identifier does not match one of the entries in said control table.

15. The computer program product according to claim 13, wherein said computer program product further includes a program code means for returning to said program code means for receiving, in response to a determination that said pre-set threshold value is not reached.

16. The computer program product according to claim 13, wherein said program code means for displacing further includes a program code means for replacing the least recently used entries in said control table.

* * * * *

UNITED STATES PATENT AND TRADEMARK OFFICE
CERTIFICATE OF CORRECTION

PATENT NO.   : 5,870,628
DATED        : February 9, 1999
INVENTOR(S)  : Chen et al.

It is certified that error appears in the above-identified patent and that said Letters Patent is hereby corrected as shown below:

On the title page, please change the attorney's name "Anthony P. Ng" to --Antony P. Ng--.

Signed and Sealed this

Twenty-eighth Day of September, 1999

Attest:

Q. TODD DICKINSON

Attesting Officer

Acting Commissioner of Patents and Trademarks